UNITED STATES PATENT OFFICE 2,158,025

PROCESS OF SOLIDIFYING SOILS

Jan van Hulst and Gerrit Hendrik van Leeuwen, Amsterdam, Netherlands, assignors to The Patent and Licensing Corporation, New York, N. Y., a corporation of Massachusetts No Drawing. Application June 5, 1935, Serial No. 25,184. In the Netherlands June 14, 1934

7 Claims. (Cl. 61—36)

The invention concerns a process for applying layers, screens or masses impermeable or substantially impermeable to water or gases in porous and previous subsoils, such as sand soils, earth masses, gravel layers and the like, as also in porous natural or artificial stony masses, or constructions of masonry, concrete and the like, and/or fixing loose or mobile subsoil, and/or filling and tightening cavities, fissures and other interruptions of the mass in said grounds and structures.

It has already been proposed, for filling cavities in ground or in structures, to inject therein by means of tubes either Portland or other cement slurry, or also hot molten bitumen. Such processes are only applicable for filling relatively large cavities, but they are unsuitable for impermeabilizing or fixing fine-grained or porous subsoils or other masses, such as sand soils or analogous masses, where the cement slurry or the molten bitumen cannot penetrate into the narrow interstices or pores.

It has also been proposed to impermeabilize or fix pervious or loose subsoil layers, etc., by causing an aqueous dispersion of bituminous substances to penetrate into the soil or mass under treatment and to coagulate at the desired place or depth. If use is made of a bitumen dispersion of a suitably adjusted particle size, the dispersion, when introduced into the ground, e. g., by means of pipes, will easily penetrate into the subsoil layer to be treated, spreading in horizontal as well as in vertical directions, and thereupon coagulate after a certain time, it being possible also to control the process of coagulation by adjusting the stability of the dispersion and the coagulating influences acting upon the same.

It has now been found that in the application of aqueous bitumen dispersions for the above-mentioned purposes improved technical effects can be obtained if use is made of mixtures of aqueous bitumen dispersions with suitable, finely divided substances.

Preferably, for the treatment of fine-grained grounds or of structures of similar porosity, the added finely-divided substances must not have a substantially greater particle size than the dispersed bitumen itself. In view thereof the additions which particularly come into consideration are the finely divided substances with colloidal properties. As such may be mentioned in the first instance the so-called more or less colloidal clays, such as bentonite, refractory blue clay, potter's clay and the like, as also the colloidally water-soluble hydroxides of polyvalent metals, such as aluminium, iron or tin hydroxides, and other colloidal metal compounds; further colloidal or peptized organic substances, such as gelatine, vegetable glue, humus or humic acid-containing substances, e. g., Cassel earth, polysaccharides, such as gum arabic, agar-agar, starch and the like.

The said finely divided substances may preferably first be suspended in water and this aqueous suspension may then be mixed with the bitumen dispersion. One may also add to the bitumen dispersion finely divided substances, such as water-glass, which are capable of being converted into peptized finely divided substances. Organic colloids may have the draw-back that they are subject to decomposition and consequently do not warrant a permanent impermeabilisation or fixation.

The technical effect of the invention consists in that with the use of equal amounts of dispersed bitumen a more complete impermeabilisation of the subsoil layer or other mass can be produced with the addition of the finely divided substances than without such addition, so that in many cases a sufficient result can be yielded with less concentrated dispersions and in general considerably less bitumen will do. Thus, for instance, if in a special case a satisfactory tightening of a sandy subsoil layer can be produced with a certain amount of a bitumen dispersion diluted to 30% of bitumen, an equivalent effect may be produced with an equal amount of bitumen dispersion, however diluted to 8% of bitumen by adding 2% of a good colloidal clay calculated on the weight of the final dispersion.

The substances, such as clay, which are added according to the invention are in general substances which in themselves do not exert any substantial flocculating or coagulating action on the bitumen dispersion. These substances further have the property that, after the action of the factors producing coagulation of the bitumen dispersion in the subsoil or mass treated, they are in a form whereby an intimate contact with the bitumen particles is effected, and in view of their presence in the water-bitumen interface of the dispersion, greater conglomerates of bitumen and the added substance are formed, which are capable of blocking up the openings in the porous mass treated still more efficiently than the coagulated bitumen can do alone.

It is already known to use clay and the other substances mentioned as emulsifiers in the manufacture of bitumen dispersions. In the known dispersions of this kind the bitumen is in most cases relatively coarsely dispersed, so that these dispersions are not well suited for use in the present impermeabilisation process. In contradistinction thereto, according to the invention, relatively finely divided bitumen dispersions are applied, which are prepared with the aid of known emulsifiers and to which a suitable amount of clay or clay suspension or other finely divided substance with colloidal properties is added, without the said clay or the like having to act as an emulsifier.

In a preferred method of carrying the invention into practice the bitumen dispersion containing the added substances may be conducted to the subsoil layer to be treated, which layer may be situated at a substantial depth under the soil surface, by inserting a number of pipes into the soil at suitable distances from each other and to such a depth that their open or perforated lower ends reach the porous soil layer in which the impervious screen is to be formed. A suitable quantity of dispersion is poured into each of these pipes, and this dispersion flows through the open ends of the pipes and spreads into the surrounding porous soil whilst filling the voids thereof. The quantity of dispersion introduced into the soil in correlation with the mutual distances of the pipes can be so regulated that the individual earthy masses impregnated with the dispersion issuing from each pipe touch and merge into one another so as to produce a practically unitary earthy mass or layer impregnated with dispersion. The dispersion thereupon coagulates under conditions which can be suitably adjusted to the character and rate of stability of the particular kind of dispersion used. The coagulated bitumen fills the voids of the porous soil and agglomerates the earthy particles, thereby producing a tightening of the porous mass and converting the same into an impervious, solidified or more or less stonified mass.

If it is desired to apply the process according to the invention for the treatment of coarse-grained soils, such as gravel layers, or for the filling of cavities, fissures and other relatively wide interruptions of the mass in ground or in structures, the substances added to the bitumen dispersions must preferably not be so finely divided as to have a colloidal character, but use may advantageously be made of non-colloidal fillers, such as Portland cement, lime, limestone powder, non-colloidal clay, fine sand, micro-asbestos, infusorial earth, trass, shale powder, coal dust and other analogous pulverulent substances. In this case also the bitumen dispersion must have such a stability that no premature separation of the bitumen occurs, whilst the conditions must be favourable for obtaining an appropriate coagulation of the dispersion at the desired places.

Such a dispersion of bitumen with fillers has a higher consistency and is less mobile than an ordinary bitumen dispersion of the same concentration, so that it can only progress slowly in the object to be filled, whereby it has the opportunity of coagulating completely. The fillers produce in the mixture a certain skeleton structure whereby the danger is avoided that the dispersion applied is pressed away by the water pressure or that it percolates through the mass to be filled. It is thus possible by means of these mixtures to tighten relatively wide cavities, which are filled up with a homogeneous composition of bitumen and filler.

It is also practicable to prepare a mixture of bitumen dispersion and filler, in which at the moment of application the bitumen is already in a preliminary stage of coagulation or which already presents a certain thickening or flocculation, so that a rapid complete coagulation is secured at the desired place.

According to the invention use can be made also of a series of different bitumen dispersions which are applied in succession. Thus, for instance, for treating an object which does not only contain wide cavities or fissures, but also narrow pores, it may be advantageous first to fill the wide cavities by means of a bitumen dispersion mixed with fillers of a relatively thick consistency, and thereafter to tighten the narrow spaces by means of a thin bitumen dispersion, which may contain finely divided substances with colloidal properties.

*Example I*

A petroleum distillation bitumen of penetration=300 at 25° C. is dispersed after heating to 120° C. in an equal quantity of a 0.5% sodium hydroxide solution heated to 40° C. and to which 1.5% of wood tar has been added. The dispersing is effected by means of an intensive mixer, e. g., a colloidal mill, with a view to producing a very fine dispersion, to which, if desired, e. g., 1–2% of casein, calculated on the weight of bitumen, may be added for stabilisation. The dispersion thus prepared, which has a bitumen content of about 50%, is mixed with half the quantity of a suspension of colloidal clay, e. g., bentonite, containing 10 kg. of bentonite per 100 litres water. Immediately before use the said mixture is further diluted with about double the quantity of water, and 2% of methyl formate, calculated on bitumen, is added. The said methyl formate, which is an easily hydrolysable ester, is slowly hydrolysed with the production of formic acid, which latter acts as a coagulant.

If it is intended to impermeabilize a sub-soil sand layer with the aid of the above dispersion, a series of foraminous pipes may be drilled into the soil at mutual distances of about 3 m. and the diluted mixture is poured into the pipes and caused to penetrate into the sand layer, so as to produce an uninterrupted layer of ground mass impregnated with the liquid. The bitumen coagulates after a certain time and, in combination with the clay, makes the sand layer at the places treated completely or substantially impervious to water.

*Example II*

A 60% bitumen dispersion is prepared by dispersing petroleum distillation bitumen of penetration=200 at 25° C. in a 0.5% soap solution, with the addition of 1% of casein, calculated on bitumen, for stabilisation. The said dispersion is mixed immediately before use with 70% by weight of a 50% cement slurry and 2% of bentonite, calculated on cement. The mixture thus produced is sufficiently liquid to be injected into the ground by means of pipes, and has the property of setting slowly. In this way it is possible, for instance, to impermeabilize a gravel layer swept by water, as the mixture completely coagulates after it has set.

*Example III*

A bitumen dispersion, prepared as in Example II, is mixed with an equal weight of a 50% suspension of limestone powder. The freshly prepared mixture can also be applied by means of pipes to the objects to be treated and coagulates completely after a certain time.

We claim as our invention:

1. A process of impermeabilizing or fixing pervious or loose subsoils and earth masses and of impermeabilizing porous masonry and other stony masses, which comprises causing a mixture of an aqueous dispersion of bituminous substances with finely divided filling substances that do not exert any substantial flocculating or coagulating action on said dispersion to penetrate into the mass under treatment and causing the said mixture to coagulate there.

2. A process according to claim 1, in which the finely divided filling substances added to the bitumen dispersion are substances with colloidal properties.

3. A process according to claim 1, in which the finely divided substances added to the bitumen dispersion are colloidal fillers of the class including colloidal clays and colloidally water-soluble hydroxides of polyvalent metals.

4. A process according to claim 1, in which the finely divided substances added to the bitumen dispersion are colloidal or peptized organic substances of the class including gelatin, vegetable glue, humus, humic-acid containing substances, and polysaccharides.

5. A process according to claim 1, especially in its application to the filling of relatively wide cavities, fissures and the like interruptions of the mass in subsoils and other earth masses, as also in porous masonry and other stony masses, in which the finely divided filling substances added to the bitumen dispersion are non-colloidal fillers of the class including cement, lime, limestone powder, clay, fine sand, micro-asbestos, infusorial earth, trass, shale powder, coal dust.

6. A process according to claim 1, in which the finely divided filling substances are added to the bitumen dispersion in the form of an aqueous suspension.

7. A process according to claim 1, in which the objects to be impermeabilized are treated first with a mixture of bitumen dispersion and finely divided non-colloidal fillers, and thereafter with a mixture of bitumen dispersion containing finely divided colloidal substances.

JAN VAN HULST.
GERRIT HENDRIK VAN LEEUWEN.